United States Patent [19]

Poole, Jr.

[11] 4,061,815
[45] Dec. 6, 1977

[54] NOVEL COMPOSITIONS
[75] Inventor: Robert E. J. Poole, Jr., Newport Beach, Calif.
[73] Assignee: The Upjohn Company, Kalamazoo, Mich.
[21] Appl. No.: 678,425
[22] Filed: Oct. 26, 1967
[51] Int. Cl.[2] .......................... F41H 1/02; F41H 5/04; B32B 5/24
[52] U.S. Cl. ...................................... 428/215; 428/310; 428/312; 428/315; 428/424; 428/425; 89/36 R
[58] Field of Search ..................... 89/36; 161/165, 162, 161/161, 160; 428/213, 214, 215, 310, 312, 315, 424, 425, 911

[56] References Cited
U.S. PATENT DOCUMENTS

| 2,723,214 | 11/1955 | Meyer | 428/911 |
|---|---|---|---|
| 3,444,033 | 5/1969 | King | 428/911 |
| 3,509,015 | 4/1970 | Wismer et al. | 428/425 |
| 3,522,142 | 7/1970 | Wismer et al. | 428/425 |

*Primary Examiner*—William J. Van Balen
*Attorney, Agent, or Firm*—Denis A. Firth; John Kekich

[57] ABSTRACT

Laminated sheet material, having high impact resistance suitable for use in constructional applications requiring high strength and resistance to deformation particularly for military usage such as armor plate, is obtained by sandwiching one or more layers of polyurethane, cellular or non-cellular, between a rigid, high impact resistant sheet of material (especially aluminum armor plate and fiberglass) in the one face and a thin retaining skin on the other. Optionally, a filler (ceramic, particulate refractory, or strip metal) is embedded in the polyurethane layer(s). Said laminates have significantly lower weight than hitherto known materials and additionally are more easily fabricated and shaped.

16 Claims, 5 Drawing Figures

ROBERT E.J. POOLE, Jr.
INVENTOR.

BY Denis A Luth
AGENT

NOVEL COMPOSITIONS

BRIEF SUMMARY OF THE INVENTION

This invention relates to laminated sheet material of high impact resistance and is more particularly concerned with light-weight laminates of polyurethane and rigid, high impact resistant materials such as fiberglass reinforced resins and high strength aluminum and steel armor plate.

It is an object of the invention to reduce substantially the weight per unit area of metal plate, particularly armor plate, without reducing in a corresponding manner the structural strength and impact resistance of said material. Conventional armor plate, even the most recently developed dual hardness steel, has to be employed in weights in excess of 35 pounds per square foot or more in order to prevent penetration by high velocity projectiles such as 50 calibre armor piercing shells. Because of the weight associated with such thicknesses of armor plate, the use of the latter is generally restricted to land and sea borne vehicles. The excessive weight and the difficulties of welding, bending, or forming such conventional armor plate prohibit the use of the material in aircraft and also seriously restrict its use in the superstructure of water borne vessels.

We have now found that the weight per unit area of armor plate of a thickness necessary to prevent deformation and/or penetration by high velocity projectiles, as defined hereinafter, can be markedly reduced without a corresponding reduction in effectiveness of the armor plate as a barrier to high velocity projectiles. This finding enables said material to be used in applications, such as armor-plating of aircraft, which were hitherto not possible. It also extends the use of the material to construction purposes of a nonmilitary character for which previously available materials were not used because of their high weight and/or high cost.

The novel laminates of the invention, in the broadest aspect thereof, comprise, in combination:

A multiplicity of layers of sheet material each layer being bonded to the next adjacent layer at the common interface thereof;

the outermost layer of material, on the one side, being selected from the class consisting of metal sheet and fiberglass reinforced resin sheet of a thickness from about 0.50 to about 1.5 inches;

the outermost layer of material, on the other side, being a skin of thickness within the range of about 0.125 to about 0.25 inches;

the said outermost layers of material having sandwiched therebetween at least one layer having a thickness within the range of about 1.0 to about 4.0 inches fabricated from an elastomeric non-cellular polyurethane having a hardness from about 95 Shore A to about 60 Shore D;

the overall thickness of said laminated sheet being within the range of about 2.0 to about 5.0 inches and the average weight of said laminate sheet being not greater than about 35 pounds per square foot.

DETAILED DESCRIPTION OF THE INVENTION

The novel laminates of the invention can be fabricated in planar form or in any other desired geometric configuration, e.g. concave, convex, cylindrical, convolute, and the like, depending upon the particular purpose for which the laminate is to be used. For purposes of convenience the specific embodiments of the invention to be described herein will be directed to planar sheets. It is to be understood, however, that the method of fabrication can be applied equally to the fabrication of laminates of any other desired confirguration without departing from the scope of the invention.

The laminates of the invention can be employed for all constructional purposes wherein it is desired to employ material having high resistance to deformation by high energy impact and particularly where the weight per unit surface area of the structure is a critical factor involved in choice of the appropriate material. The laminates of the invention are of particular usefulness in the armor-plating of landborne, airborne and waterborne vehicles of all kinds, both military and civilian, which are exposed to risk of damage or destruction from assault and/or penetration by high speed projectiles of various kinds.

However, the laminates of the invention are not limited to such uses and can be employed generally, for example, in marine vessels, automobiles and transportation vehicles and the like containers wherever a combination of high strength and relatively low weight is desired. These latter uses are particularly suitable for these laminates of the invention in which the outermost layer of material is fiberglass reinforced resin since such laminates are those most readily fabricated in non-planar configurations.

The invention will now be described by reference to a number of specific embodiments thereof. The latter are given for purposes of illustration only and are not limiting as to scope of the invention.

Figure 1:
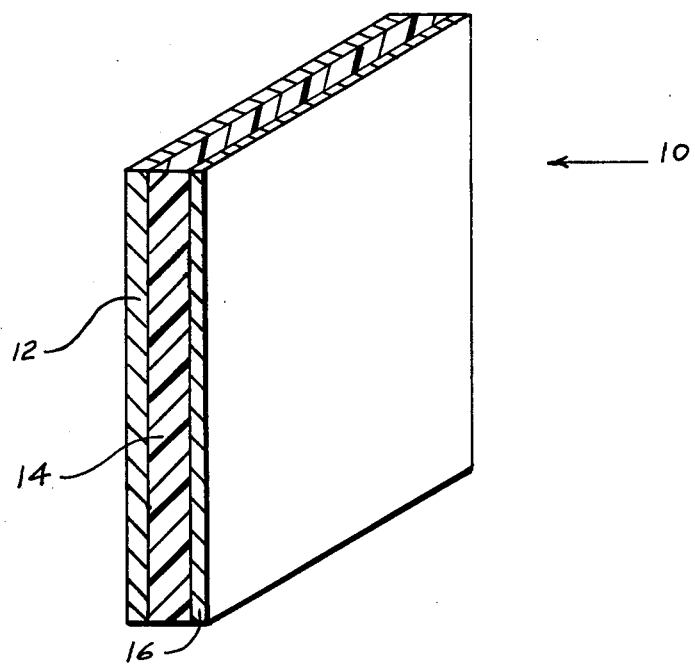
FIG. 1 is a cross-sectional perspective view of a specific embodiment of the invention.

In FIG. 1 there is shown a perspective cross-sectional representation of a laminate 10 in accordance with the invention. Said laminate is composed of three layers each layer being in the form of a plane sheet. Outer layer 12 (i.e. the layer intended to receive the initial anticipated impact) is fabricated from metal, advantageously from aluminum plate or from fiberglass reinforced resins particularly those resins commonly employed in the construction of marine hulls, automobile bodies and the like. Said reinforced resins include polyester and epoxy resins reinforced with fiberglass. Such resins and their method of preparation and fabrication are described in Handbook of Reinforced Plastics of the SPI, Oleesky et al., Reinhold Publishing Corporation, New York, 1964 particularly at pp. 13–55, 71–80, and 117–166. The thickness of layer 12 can be varied to impart the required impact resistance and strength for any particular use to which the finished laminate is to be put. Advantageously, the thickness of the layer 12 is within the range of about 0.50 to about 1.5 inches. Where the ultimate intended use of the laminate is armor-plating for military purposes the material employed to fabricate the layer 12 is preferably aluminum armor plate. Where the ultimate intended use of the laminate is nonmilitary, the material employed to fabricate the layer 12 is preferably fiberglass reinforced resin.

In the specific embodiment shown in FIG. 1, each of the surfaces of the layer 12 is essentially smooth but it will be appreciated that one or both of said surfaces can assume other configurations. For example, said surfaces can be corrugated or have raised projections such as a waffle type pattern, or the like, placed thereon for purposes of decoration or, in some cases, to impart additional strength to the layer.

The inner layer 14 shown in FIG. 1 is fabricated from non-cellular polyurethane. The non-cellular polyurethane layer 14 advantageously has a hardness in the range of about 95 Shore A to about 60 Shore D, a tensile strength (100% modulus as determined by ASTM D-412) of at least about 500 psi, an elongation set of less than about 15% and a tear strength of at least about 150 pli (Die "C": ASTM D-624) and about 40 pli (split tear: ASTM D-624).

The non-cellular polyurethane layer 14 can be prepared by any of the methods known in the art; see, for example, Saunders et al., Polyurethanes, Chemistry and Technology, Part II, pp. 299 et seq., Interscience Publishers, New York, 1964. A typical formulation is as follows:

A total of 100 parts by weight of a polycaprolactone diol (prepared from ε-caprolactone and 1,4-butanediol according to the procedure described in U.S. Pat. No. 2,933,478; hydroxyl number 127) is added, under nitrogen with stirring, to 86.8 parts by weight of 4,4'-methylenebis(phenyl isocyanate). The temperature is kept below 190° F during the admixture. The resulting isocyanate-terminated prepolymer (100 parts by weight) is degassed by stirring under vacuum for a short period in the molten state. To the degassed prepolymer is added a mixture of 9.49 parts of 1,4-butanediol and 1.05 parts of trimethylolpropane, the addition being made under vacuum. The resulting mixture is then poured or cast as described below.

The layer 14 when prepared from a non-cellular polyurethane can be cast or molded in the form of a sheet and subsequently bonded to the metal layer 12 using an appropriate adhesive. Preferably, the polyurethane layer 14 is poured in place on the layer 12 using a suitable edge mold, if desired. The non-cellular polyurethane layer 14 so produced is bonded directly in place and no adhesive is necessary.

The outer skin 16 of the specific embodiment shown in FIG. 1 functions chiefly as a protective and retaining layer for the inner polyurethane layer 14. The skin 16 can be fabricated from any suitable material such as aluminum sheet, polyester, reinforced plastics such as fiberglass reinforced polyester, polyurethane elastomer, and the like. The thickness of this layer is not critical insofar as the overall structural strength of the laminate is concerned. Advantageously, the thickness is of the order of at least about 0.125 up to about 0.25 inches. The desirable thickness in the case of any given material is readily determined by a process of trial and error.

In all applications for which the laminate of FIG. 1 is employed the layer 12 is that side of the laminate which is exposed to the force of impact which the laminate is designed to meet. The function of the skin layer 16 is, in general, to prevent or minimize the splattering of material from the polyurethane layer 14 caused by the impact.

Figure 2:
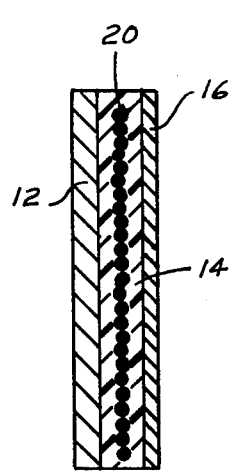
FIG. 2 is a cross-sectional view of another embodiment of the invention.

In FIG. 2 there is shown in cross-section another illustrative embodiment of the invention. In this embodiment the three layers [the layer 12, the polyurethane layer 14, and the skin layer 16] are fabricated from the materials previously described using the thickness and mode of procedure discussed above for the modification shown in FIG. 1. The embodiment shown in FIG. 2 differs from that in FIG. 1 in the use of a filler material 20 in the polyurethane layer 14 of FIG. 2. In the illustration shown in FIG. 2 this material 20 is depicted as particulate in form. Advantageously, said particulate material has an average particle diameter from about 0.25 to about 0.75 inches. Examples of such particulate fillers are ceramic material such as gravel, crushed granite, quartz and like metallic particles, for example steel pellets or fragmentary metal, synthetic inorganic fillers in particulate form such as fused aggregates of metal oxides, and the like. A particularly useful filler is alumina in the form of balls, tablets, capsules and the like. The material available as "T-162 Tabular alumina" (Alcoa Chemicals) is typical of the preferred form of filler. The dimensions of the individual particles of filler material can vary over a wide range provided the average dimensions are within the quoted range. The amount of filler 20 included in the polyurethane layer 14 is advantageously such that a substantially continuous layer of filler is produced, i.e. the individual particles within the layer lie in close proximity to their surrounding neighbors. The filler material is embedded in the layer either of FIG. 2 or in two or more layers disposed between opposite surfaces of the layer 14. The filler is embedded in the polyurethane layer in a convenient manner by pouring said layer in two or more portions. For example, if a single layer of filler 20 is employed, it can be deployed in a plane approximately midway between the outer surfaces of the polyurethane layer by the following procedure. Approximately one-half the polyurethane mix required to produce the polyurethane layer is used to pour a first portion of the layer. The filler material is then distributed over the exposed surface of the freshly poured polyurethane layer, and the second portion of polyurethane is then poured. If more than one layer of ceramic or other filler material is embedded in the polyurethane layer the layers can be so embedded by pouring the polyurethane layer in multiple portions and dispersing filler material over the surface of each newly poured layer of polyurethane before pouring the next portion.

In a preferred form of the embodiment shown in FIG. 2 the cross-sectional dimensions of the particles of the filler material 20 are so chosen that they correspond approximately to the thickness of the layer 14. Thus, in said preferred form the filler material 20 consists of particles of fused alumina having an average cross-sectional diameter of 0.375 to 0.5 inches embedded in a layer 14 having a thickness from about 0.5 to 0.625 inches, said particles being disposed within said layer 14 in such close relationship that the maximum distance between abutting faces of neighboring particles is not greater than about 0.125 inches.

Figure 3:
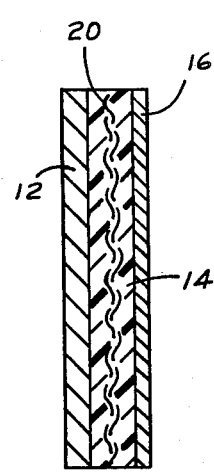
FIG. 3 is a cross-sectional view of a further embodiment of the invention.

In FIG. 3 there is shown in cross-section a further specific embodiment of a laminate in accordance with the invention wherein the polyurethane layer 14, prepared as discussed above in reference to the embodiment of FIG. 2, has embodied therein a filler material 20. In this specific embodiment the filler material 20 takes the form of a corrugated spring steel strip. Preferably multiple layers of steel strips are embedded in the polyurethane layer 14 of this embodiment, the strips in each layer being so arranged that they overlap the corresponding strips in adjacent layers, i.e. the individual strips in any given layer lie immediately above and below the gaps between strips in the neighboring layers. The dimensions and overall shape of said steel strips can be varied over a wide range, but we have found it particularly advantageous to employ strips cut from heat stressed steel strip one inch in width and 0.125 inch thickness. The methods of embedding the steel strip in the polyurethane are advantageously those discussed above in connection with the filler employed in the embodiment of FIG. 2. In place of the steel strip 20 there can be used strips of hard polymer such as polycarbonate, polypropylene, and the like.

Figure 4:
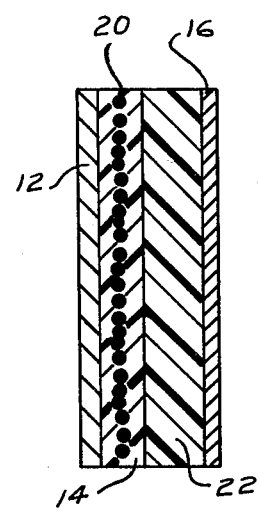
FIG. 4 is a cross-sectional view of yet another embodiment of the invention.

FIG. 4 illustrates a further specific embodiment according to the invention in which multiple polyurethane layers are incorporated between the outer layer 12 and the skin layer 16. In this specific embodiment two such polyurethane layers, 14 and 22, are shown. The layer 14 is a polyurethane elastomer layer in which are embedded filler materials, the mode of construction, nature of the filler, overall dimensions, and the like, of said layer corresponding, in the particular embodiment shown, to those described for the corresponding layer 14 in the specific embodiment of FIG. 2 discussed above. It is to be understood, however, that the layer 14 in FIG. 4 can be any of the polyurethane elastomer layers having embedded therein any of the filler materials hereinbefore discussed and described.

The second layer 22 in the specific embodiment of FIG. 4 is also a non-cellular polyurethane layer having the same properties and dimensions and fabricated in the same manner as described hereinbefore for the polyurethanes employed in the layer 14 of the specific embodiment of FIG. 2. In the specific embodiment of FIG. 4 the layer 22 is represented as free from filler material but it will be appreciated that filler materials, of the type discussed hereinbefore for filler material 20 of the embodiments of FIGS. 2 and 3, can be included in layer 22 if desired. It will also be appreciated that laminates within the scope of the present invention can be provided in which there are three or more different layers bonded between the under layer 12 and the skin 16. Said multiple polyurethane layers can be of the same or different compositions and can have the same or different filler materials incorporated therein, if desired.

Figure 5:
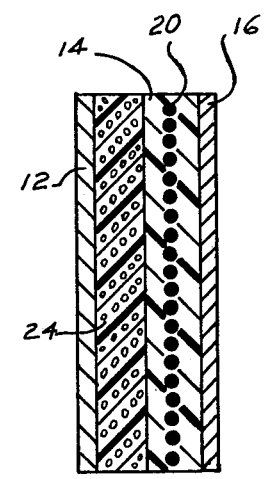
FIG. 5 is a cross-sectional view of yet another embodiment of the invention.

A modification of the multiple layer laminate of FIG. 4 is shown in FIG. 5. This modification is of particular value in the fabrication of marine vessels and the advantages which it presents for this purpose will be readily apparent. In this particular modification the outer layer 12 is prepared from fiberglass reinforced resin and has a thickness within the limits set forth above for the outer layer 12. Between the outer layer 12 and the polyurethane layer 14, which has embedded therein filler material 20 and corresponds in all respects to said layer 14 shown in the embodiment of FIG. 2, there is interposed a layer 24 of rigid cellular polymer 24. Said layer can have a density varying within wide limits depending upon the particular application for which the resulting laminate is to be employed. Advantageously, the density of said foam layer is within the range of about 2 to about 40 psi and preferably is in the range of about 2.5 to about 10 psi. Similarly, the thickness of said layer 24 can vary within wide limits, subject to the total weight of the laminate remaining within the range set forth above. Advantageously, the thickness of said layer varies within the range of about 0.5 to about 5 inches and is preferably within the range of about 2 inches. Said rigid polymer foam layer 24 can be fabricated from any of the rigid cellular polymers known in the art such as polyethylene foam, polyvinyl chloride foam, polyimide foam, polyamide foam, polyurethane foam, and the like, using any of the procedures well-known in the art for the preparation of such foams. Preferably, the layer 24 is fabricated from rigid polyurethane foam which can be poured in place on to the outer layer 12 or can be fabricated separately in sheet form and then bonded to the adjacent layers 12 and 14 using polyurethane adhesives well-known in the art.

In making said rigid polyurethane foam layer 24 there can be used any of the methods known in the art; see, for example, Saunders et al., ibid, Part II, pp. 193–298. If desired, a sheet of fiberglass reinforced resin can be interposed between the rigid polymer foam layer 24 and the polyurethane elastomer layer 14 to impart additional strength to the resulting laminate. This optional sheet can be of a thickness within the range of about 0.25 to about 1 inch. Said sheet can be preformed and bonded to the adjacent preformed layers in said laminate or the various layers can be built up serially by pouring or forming such layer in place as discussed hereinbefore.

It will be appreciated that laminates corresponding to the embodiment shown in FIG. 5 but containing two or more rigid polymer foam layers and/or two or more polyurethane elastomers can be fabricated using the same procedures and criteria for dimensions etc. Such laminates are also within the scope of the existing invention.

As set forth above the novel laminates which fall within this invention possess high impact resistance and structural strength comparable to materials such as dual hardness steel and the like but possess the advantage that, on an equivalent strength basis, the laminates of the invention are significantly lighter in weight than the materials hitherto available. Additionally, the laminates of the invention possess the marked advantage of being readily fabricated, cut, shaped, molded, bonded or otherwise worked and used in both planar and non-planar forms whereas the materials hitherto available are not readily worked in any of the above ways.

While the novel compositions of the invention have been described above with reference to certain specific embodiments thereof it is to be clearly understood that these embodiments have been given for purposes of illustration only and are not intended to be limiting. The scope of the invention is bounded only by the scope of the claims which are set out hereafter.

I claim:

1. A laminated sheet characterized by high impact resistance which comprises, in combination, a multiplicity of layers of sheet material, each layer being bonded to the next adjacent layer at the common interface thereof;

the outermost layer of material on the one side being selected from the class consisting of metal sheet and fiberglass reinforced resin having a thickness from about 0.50 to about 1.5 inches;

the outermost layer of material on the other side being a retaining skin having a thickness within the range of about 0.125 to about 0.25 inches;

the said outermost layers of material having sandwiched therebetween at least one layer having a thickness within the range of about 1.0 to about 4.0 inches fabricated from an elastomeric non-cellular polyurethane having a hardness from about 95 Shore A to about 60 Shore D;

the overall thickness of said laminated sheet being within the range of about 2.0 to about 5.0 inches and the weight of said laminated sheet being not greater than about 35 pounds per square foot.

2. A laminated sheet according to claim 1 wherein the inner layer of polyurethane elastomer has embedded therein a filler.

3. A laminated sheet according to claim 2 wherein the filler is particulate ceramic material.

4. A laminated sheet according to claim 2 wherein the filler comprises particulate fused alumina having an average cross-sectional dimension from about 0.375 to about 0.5 inches.

5. A laminated sheet according to claim 2 wherein the filler is metallic.

6. A laminated sheet according to claim 5 wherein the filler is composed of corrugated spring steel strips.

7. A laminated sheet according to claim 1 wherein the thicker of the outer layers is aluminum armor plate.

8. A laminated sheet according to claim 1 wherein each of the two outermost layers is fabricated from fiberglass reinforced resin.

9. A laminated sheet characterized by high impact resistance which comprises, in combination, a multiplicity of sheet material each layer being bonded to the next adjacent layer at the common interface thereof;

the outermost layer of material on the one side being a fiberglass reinforced resin sheet having a thickness within the range of about 0.50 to about 1.5 inches;

the outermost layer of material on the other side of said laminated sheet being a retaining skin having a thickness within the range of about 0.125 to about 0.25 inches;

the inner layers of material in said laminate comprising a layer of rigid polymer foam bonded directly to the thickest of the outermost layers and a layer of polyurethane elastomer bonded to the other outermost skin layer of said laminate;

said layer of rigid polymer foam having a density of about 2 psi to about 40 psi and a thickness of about 0.5 to about 5.0 inches;

said layer of polyurethane elastomer having a thickness within the range of about 1.0 to about 4.0 inches and a hardness from about 90 Shore A to about 65 Shore D;

the overall thickness of said laminated sheet being within the range of about 2.0 to about 5.0 inches and the weight of said laminated sheet being not greater than about 35 pounds per square foot.

10. A laminated sheet according to claim 9 wherein the polymer foam is a rigid polyurethane foam.

11. A laminated sheet according to claim 9 wherein a layer of fiberglass reinforced resin is interposed between said layer of rigid polymer foam and said layer of polyurethane elastomer.

12. A laminated sheet according to claim 9 wherein said polyurethane elastomer has embedded therein a filler.

13. A laminated sheet according to claim 12 wherein the filler is particulate ceramic material.

14. A laminated sheet according to claim 12 wherein the filler comprises particulate fused alumina having an average cross-sectional dimension from about 0.375 to about 0.5 inches.

15. A laminated sheet according to claim 12 wherein the filler is metallic.

16. A laminated sheet according to claim 15 wherein the filler is composed of corrugated spring steel strips.

* * * * *